T. RIGBY.
REMOVAL OF MOISTURE FROM PEAT OR OTHER SUBSTANCES.
APPLICATION FILED MAY 15, 1912.
1,124,954.
Patented Jan. 12, 1915.
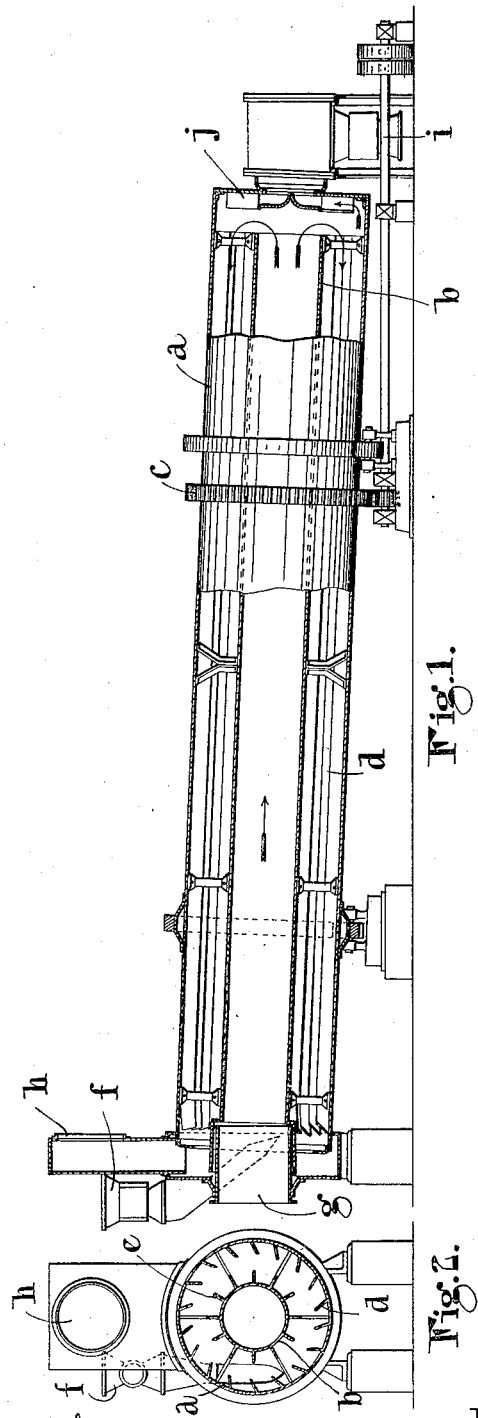
WITNESSES
Sidney Brooks
J. P. Davis
INVENTOR
Thomas Rigby
BY
Munn & Co.
ATTORNEYS

UNITED STATES PATENT OFFICE.

THOMAS RIGBY, OF DUMFRIES, SCOTLAND, ASSIGNOR, BY MESNE ASSIGNMENTS, TO WETCARBONIZING LIMITED, OF LONDON, ENGLAND.

REMOVAL OF MOISTURE FROM PEAT OR OTHER SUBSTANCES.

1,124,954. Specification of Letters Patent. Patented Jan. 12, 1915.

Application filed May 15, 1912. Serial No. 697,425.

*To all whom it may concern:*

Be it known that I, THOMAS RIGBY, engineer, a subject of the King of Great Britain and Ireland, and residing at Station Hotel, Dumfries, Scotland, have invented certain new and useful Improvements in and relating to the Removal of Moisture from Peat or other Substances, of which the following is a specification.

This invention relates to the removal of moisture from wet carbonized peat and from other substances.

When peat has been wet carbonized by such a process as that described by Ekenberg, it is necessary before the peat can be utilized, to separate the same from the water with which it is mixed, to such an extent at least, for most purposes, that a material is obtained which contains not more than about 55 per cent. of water. If for this purpose the fluid material leaving the wet carbonizing apparatus is passed into a filter press or similar device, the water may be removed therefrom to such an extent that the resulting press cake contains about 70 per cent of water. Some further treatment is, however, necessary further to reduce the moisture content. This may take the form of pressing in a band press.

It is the principal object of the present invention to provide a method alternative to that last indicated of removing this latter quantity of water which shall be economical and efficient, this method being, however, also capable of use in other connections.

A further object is to provide an improved process for the utilization of peat.

This invention consists in a drying method for material of the nature indicated, including effecting the removal of the water down to the desired extent, say to 55% moisture or less in two stages, the first consisting in removing the bulk of the water in a filter press or the like and the second consisting in completing the desired drying by heating the material in a suitable drying apparatus as by exposing the same to the direct drying action of a heated gaseous medium such as waste flue gases from one or more heating elements of the installation in connection with which the drying is being carried on.

This invention also consists in a method of drying and treating wet carbonized peat in the utilization of peat in which, after the water content is reduced to a certain extent in the manner indicated the material is subjected to a grading action to separate the larger portions from the smaller portions, the former being supplied as fuel to a producer, such as an ammonia recovery producer, capable of supplying power in connection with the installation, or being used for any other desired purpose, and the latter being supplied to driers, such as Schultze driers, for drying the material sufficiently to render it fit for use in the production of briquet fuel, or being applied for any other desired purpose.

It is to be observed that when the method above indicated is applied to the drying of filter pressed wet carbonized peat there is no danger in exposing the same to the direct action of hot waste flue gases, as the pressed material usually contains water to the extent of about 68–70 per cent. and the drying by this method is not usually carried below about 55 per cent., and it is only with a water content lower than this figure that the substance disintegrates into such fine powder, that danger of ignition arises.

In carrying out this process according to one form, filter pressed wet carbonized peat is placed in a rotating drum drier into which is passed waste flue gases at any desired temperature. Where driers such as Schultze driers are used in the peat treating installation it is desirable to heat these by steam in order to obtain easy regulation of temperature efficient heating and large output per unit of plant and to use steam for power, and advantage may be taken of this in the present connection by using the waste gases from the boilers supplying the steam as the heating medium. These gases may pass partly directly into the drum drier and partly indirectly by way of the peat carbonizers, the distribution of these gases between the elements of plant being arranged to suit the heat requirements of the respective elements and may be in series or parallel or multiple parallel. In large plants the gases may be obtained from separate boilers. The rotating drum tumbles the material about and exposes it thoroughly to the action of the hot gases, whereby the same is rapidly dried to a water content of about 55 per cent. or less if desired, where the material leaves the drying apparatus. A certain amount of disintegration of the press cakes will take place in the drier and the issuing material is therefore preferably subjected to a grading action in a sifter or other appliance whereby the coarser material is separated from the finer. These grades may then be applied to the particular uses for which they are most suitable, for example, the coarser may be employed as fuel in an ammonia recovery producer, while the finer may be supplied to devices such as Schultze driers, to be rendered suitable for use as raw material in the production of briquet fuel. Practice has shown it desirable to granulate the material to a more or less uniform condition before drying as large pieces tend to become only superficially dried. Even under these circumstances owing to the formation of dust during drying the resultant material is not of a very uniform size and it is therefore desirable if the material is used in a producer to consolidate it into cakes by suitably pressing the same.

The accompanying drawings illustrate a known form of drier—the Ruggles-Coles drier—which can advantageously be adapted to the present purpose, Figure 1 showing the same in part sectional side elevation and Fig. 2 the same in sectional end elevation.

This drier comprises two inclined concentric tubes $a$ and $b$ connected by stays and adapted to be rotated by a gear ring $c$. On the inside of the outer tube $a$ and the outside of inner tube are arranged ribs $d$ and $e$ respectively so that material introduced by the hopper $f$ not only gradually descends the space between the tubes but is by the ribs $d$ and $e$ repeatedly lifted up and dropped and so thoroughly exposed to drying action. The material is picked up by the scoops $j$ at the lower end and fed out through the outlet $i$. As applied to the present purpose the gas inlet $g$ is connected say to the flue of the carbonizer of the installation or to the boiler furnace flue, any suitable damper or other regulator being inserted in the path of the gases. The gas outlet $h$ is connected to an exhauster in the usual way. The hopper $f$ is adapted to be fed from a disintegrator which reduces the filter press cakes supplied to it into a more or less uniform granular condition and the material leaving the outlet $i$ is suitably conducted to sifting devices, pressing appliances and the like for the purposes already indicated.

It will be seen that this process, while applicable in different ways, and to different purposes, is of particular advantage when employed in connection with a wet peat carbonizing process, where it is desired to remove the water from the wet carbonized peat more completely than is readily possible by the use of filter presses alone, in which case it affords a cheap and economical alternative method to the purely pressing method referred to.

Having now described my invention what I claim as new and desire to secure by Letters Patent is:—

1. A method of removing liquid matter from peat, consisting in subjecting the peat to heat treatment, rendering such matter more readily separable from the peat, then removing such matter by filtration under pressure, disintegrating the solid substances thus obtained, and further drying such substances by direct contact with a gaseous drying medium.

2. A method of making briquet fuel from peat, consisting in subjecting the peat to heat treatment, adapted to set free liquid matter in the peat, removing such matter by filtration under pressure, disintegrating the resulting solid and thereupon subjecting the powder obtained to direct contact with a hot drying medium until the powder is suitable for briqueting.

3. In the manufacture of fuel from peat, subjecting the peat to heat while preventing ebullition until liquid matter held in the peat is liberated therefrom, filter pressing the heated peat until the water content thereof is reduced to about 70%, disintegrating the mass and then exposing the same to hot flue gases until suitable for briqueting.

4. In the manufacture of briquets from peat, heating the peat to an elevated temperature under pressure sufficient to prevent ebullition in order thereby to liberate liquid retained in the peat, removing such liquid by filter pressing followed by drying the material as a uniform powder exposed to hot flue gases until suitable for briqueting.

5. In the manufacture of briquets from peat, heating the peat under pressure to set free liquid retained in the peat, removing liberated liquid by filter pressing, disintegrating part of the resulting solid material, exposing the powder obtained to a hot drying medium until suitable for briqueting and gasifying another part of said solid material in order to produce gas resulting ultimately in the production of a medium suitable for drying said disintegrated material.

6. A method of removing liquid matter from peat, consisting in subjecting the peat to heat treatment in order to render such matter more readily separable from the peat, removing said matter by filtration under pressure, disintegrating the solid substance thus obtained to produce a substantially uniform powder, and thereupon drying said powder by direct contact with hot flue gases.

In testimony whereof I have affixed my signature in the presence of two witnesses.

T. RIGBY.

Witnesses:
  E. C. WALKER,
  B. H. MATTHEWS.

Copies of this patent may be obtained for five cents each, by addressing the " Commissioner of Patents, Washington, D. C."